(12) United States Patent
Hsu

(10) Patent No.: US 6,847,684 B1
(45) Date of Patent: Jan. 25, 2005

(54) ZERO-BLOCK ENCODING

(75) Inventor: Wei-Lien Hsu, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 610 days.

(21) Appl. No.: 09/585,492

(22) Filed: Jun. 1, 2000

(51) Int. Cl.[7] ............................................. H04N 7/12
(52) U.S. Cl. ..................... 375/240.16; 375/240.01; 375/240.02; 375/240.03; 375/240.04
(58) Field of Search .................. 375/240.16, 240.04, 375/240.01, 240.02, 240.03; 378/240; 382/251, 240

(56) References Cited

U.S. PATENT DOCUMENTS

| | | | |
|---|---|---|---|
| 5,333,012 A | * | 7/1994 | Singhal et al. ......... 375/240.04 |
| 5,453,799 A | | 9/1995 | Yang et al. ................ 348/699 |
| 5,892,548 A | * | 4/1999 | Kim ....................... 375/240.04 |
| 6,005,980 A | | 12/1999 | Eifrig et al. ................ 382/236 |
| 6,011,870 A | | 1/2000 | Jeng et al. .................. 382/236 |
| 6,026,195 A | | 2/2000 | Eifrig et al. ................ 382/236 |
| 6,026,217 A | | 2/2000 | Adiletta ................. 395/200.77 |
| 6,037,985 A | | 3/2000 | Wong ......................... 348/405 |
| 6,047,088 A | | 4/2000 | van Beek et al. ........... 382/243 |
| 6,071,004 A | | 6/2000 | Le Gall et al. ......... 364/514 R |
| 6,072,830 A | | 6/2000 | Proctor et al. ............... 375/240 |
| 6,111,991 A | * | 8/2000 | Ribas-Corbera et al. .... 382/251 |
| 6,115,420 A | * | 9/2000 | Wang .................... 375/240.03 |
| 6,546,143 B1 | * | 4/2003 | Taubman et al. ........... 382/240 |

* cited by examiner

Primary Examiner—Chris Kelley
Assistant Examiner—Allen Wong

(57) ABSTRACT

In a multimedia compression system such as is used in compressing data in a video stream, "zero blocks" from an MPEG block array are identified prior to encoding and subjecting blocks to the process of quantized discrete cosine transform (DCT). A zero block as understood herein is an MPEG video data block that results when an unencoded block of video data is identical to an adjacent un-encoded block of video data, i.e., when there is little or no change between consecutive frames of video. The efficiency of the compression system is increased in this invention by not having to perform the functions of DCT, quantization, dequantization or inverse DCT on the identified zero blocks, but simply directly encoding zero blocks.

13 Claims, 3 Drawing Sheets

ZERO-BLOCK ENCODING

FIELD OF THE INVENTION

This invention relates to multimedia compression, and more specifically to a technique for detecting zero-blocks prior to differential-block encoding a video stream.

BACKGROUND OF THE INVENTION

With the advent of computer networks, the storage and transmission of multimedia content has become commonplace. In this environment, a number of compression techniques and standards have emerged to reconcile data-intensive media such as audio and video with the typically limited storage capacity of computers, and with the typically limited data rates for networks.

One such standard for digital audio/video compression has been developed by the Moving Pictures Expert Group (MPEG) of the International Standards Organization. This standard was first promulgated as MPEG-1, and has undergone several revisions named MPEG-2 (broadcast quality video in a four-megabit-per-second channel), MPEG-3 (conceived as a standard for high-definition television, now canceled), and MPEG-4 (medium-resolution videoconferencing with low frame rates in a sixty-four-kilobit-per-second channel). These standards are collectively referred to herein as MPEG.

MPEG employs single-frame compression based upon a two-dimensional discrete cosine transform ("DCT"), and quantization of the resulting transform coefficients. In this respect, it resembles the Joint Photographic Experts Group ("JPEG") still image compression standard. The MPEG standard provides further compression based upon temporal redundancy.

The MPEG standard is complex, particularly in view of the Constrained Parameter Bitstream (CPB) profile, which further defines the MPEG standard to ensure compatibility among particular implementations. However, since MPEG achieves high compression ratios, it is widely used. Even with the CPB profile, MPEG provides a significant amount of design flexibility. While the flexibility of MPEG has led attention to be focused on methods for achieving greater compression ratios in the video stream, and on ensuring that the video stream can be decoded at an adequate frame rate, there remains significant room for improvement at the encoding end of MPEG systems.

The known basic scheme is to predict motion from frame to frame in the temporal direction, and then to use DCTs (Discrete Cosine Transforms) to organize any redundancy in the spatial directions. The DCTs may be done on 8×8 blocks, and the motion prediction is done in the luminance (Y) channel on 16×16 blocks. In other words, given the 16×16 block in the current frame that is intended to be coded, the object is to look for a close match to that block in a previous or future frame (there are backward prediction modes where later frames are sent first to allow interpolating between frames). The DCT coefficients (of either the actual data or the difference between this block and the close match) are quantized, which means that they are divided by some value to drop bits off the lower end. Hopefully, many of the coefficients will then end up being zero. The quantization can change for every macroblock (a macroblock is 16×16 of Y and the corresponding 8×8's in both U and V). The result of all of this, which includes the DCT efficients, the motion vectors and the quantization parameters is Huffman coded preferably using fixed tables. The DCT coefficients have a special Huffman table that is two-dimensional in that one code specifies a run-length of zeros and the other, a non-zero value that ended the run.

As known in the art, there are three types of coded frames. There are I or intra frames. They are simply a frame coded as a still image, not using any past history. Then there are P or predicted frames. They are predicted from the most recently reconstructed I or P frame. Each macroblock in a P frame can either come with a vector and difference DCT coefficients for a close match in the last I or P, or it can just be intra coded (like in the I frames) if there was no good match.

Lastly, there are B (bi-directional) frames. They are predicted from the closest two I or P frame, one in the past and one in the future. It is desirable to search for matching blocks in those frames, and try different comparisons, e.g., the forward vector, the backward vector, and try averaging the two blocks from the future and past frames, and subtracting that from the block being coded. If none of those will work, the block may be intra coded.

In particular, the quantized discrete cosine transform (DCT) coefficients of an eight-by-eight MPEG block are typically sparse, that is, a large percentage of blocks contain fewer than five significant coefficients. This is particularly true of inter-coding, where a current block is derived from previous or future blocks. Inter-coded frames frequently contain no significant coefficients whatsoever, yet a conventional MPEG encoder performs all of the DCT, quantization, dequantization, and inverse DCT steps on these blocks in the same manner as on other blocks.

SUMMARY OF THE INVENTION

According to the invention, a video encoder is functionally enhanced by identifying "zero blocks" prior to encoding.

A zero block as understood herein is an MPEG block that results when an unencoded block of video data is substantially identical to an adjacent un-encoded block of video data, i.e., when there is little or no change between consecutive frames of video. In one embodiment of the invention, an MPEG video encoder detects a zero block prior to encoding by comparing the total energy of a difference image to the quantization step size. When the total energy of the difference image is smaller than the square of the quantization step size, then the encoded block will not contain any quantized coefficients. The difference image may therefore be directly encoded as a zero block without further processing.

It has been found that a high percentage of the blocks of video data contains less than five significant coefficients especially in interceding. More frequently than not, many blocks of video data do not contain any significant quantized coefficients. Known coding schemes where all video blocks are processed the same way have computation redundancy. Computation includes discrete cosine transform (DCT) operation, inverse DCT (i.e., IDCT), quantization and dequantization. Detection of zero blocks enables reduction of computational redundancy and enhances coding efficiency.

The present invention, in its broad form resides in an MPEG encoder/decoder system of the type wherein each picture frame is divided into blocks which are processed and encoded based on a quantization step size and a difference image between consecutive blocks, the system comprising a motion estimation unit which performs estimation/compression and compares a previous video frame stored with current video input, and looks for matches to generate a motion vector signal, and a zero block encoding unit which calculates a square value of a first quantization step and ascertains if a total energy value of said difference image is smaller than the calculated value of the first quantizations step, the zero block encoding unit acting to identify a zero block if the ascertaining is affirmative and to encode a block directly without additional processing.

The invention also resides in a video data compressing method of the type wherein each picture frame is divided into blocks which are processed and encoded based on a quantization step size and a difference image between consecutive blocks, the method including the step of identifying at least one zero block which results when an un-coded block of video data is identical to an adjacent un-coded block of video data by (i) comparing total energy of a difference image to a quantization step size; (ii) ascertaining if the total energy of the difference image is smaller than a square of the quantization step size; and (iii) if (ii) is true, then directly encoding a zero block without any other processing.

BRIEF DESCRIPTION OF THE DRAWINGS

The invention description below refers to preferred exemplary embodiments described in conjunction with the accompanying drawings, of which.

DETAILED DESCRIPTION OF AN ILLUSTRATIVE EMBODIMENT

Figure 1:
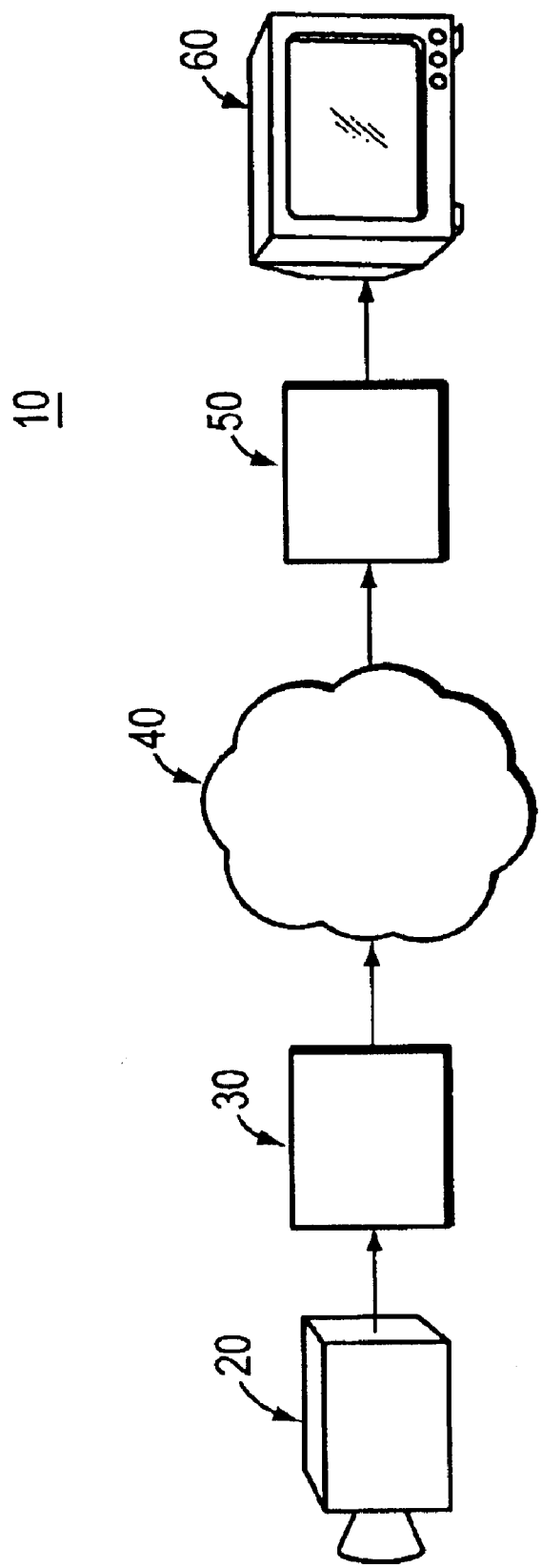
FIG. 1 is a multimedia encoder/decoder system.

FIG. 1 shows a multimedia encoding/decoding system 10 according to a preferred embodiment of the present invention. The system 10 comprises a digital camera 20 that captures visual images in digitized frames and provides the frames in digital form to an encoder 30. The encoder 30 applies an encoding algorithm to compress the digitized frames for storage or transmission via a medium 40. A decoder 50 receives the encoded, digitized frames from the medium 40 and provides them in suitable form to a display 60.

It will be appreciated that the encoder 30 may include specialized encoding hardware such as a programmable gate array, an application specific integrated circuit, a microcontroller, a digital signal processor, or a combination of individual functional components, or the encoder 30 may be implemented in software using a general purpose computer device with a microprocessor and a memory. It will further be appreciated that the medium 40 may comprise any medium for storage and/or transmission of digital information that can receive digital information from the encoder 30 and transmit digital information to the decoder 50. This may include a computer network such as the Internet or any other private or public network, or a storage device such as a memory, a hard disk drive, or any other digital storage device known in the art.

The invention is described herein with reference to a preferred embodiment using the MPEG-2 standard. However, it will be clear to those skilled in the art that the invention may be usefully practiced with any video compression standard that encodes frames using differential or predictive techniques, including MPEG-1, MPEG-4, and H.261 (a teleconferencing standard).

Figure 2:
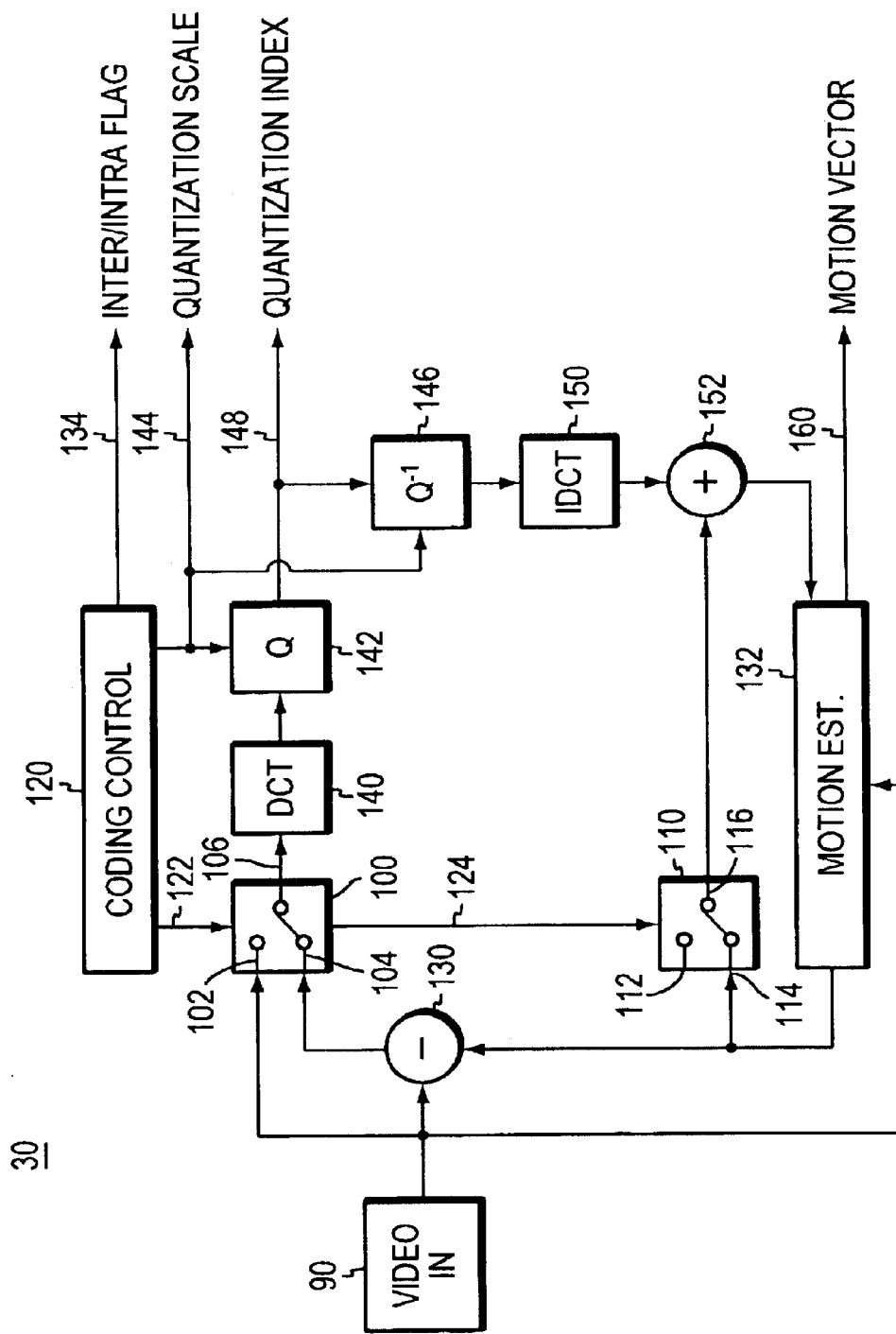
FIG. 2 is a prior art MPEG encoder.

FIG. 2 shows a conventional MPEG encoder 30 that receives a video input 90 for MPEG encoding. The encoder 30 includes a first switch 100 having a first input 102, a second input 104, and an output 106. The encoder 30 also includes a second switch 110 having a first input 112, a second input 114, and an output 116. The switches receive control signals from a coding control unit 120 along a first control line 122 and a second control line 124. The control lines 122, 124 provide signals from the conding control unit 120 for each switch 110, 120 to select between its first and second inputs. These switches 100, 120 may be conceptual, and may not correspond to a physical switch in a particular software implementation of the encoder 30.

The video input 90 is provided to the first input 102 of the first switch, to a differencer 130, and to a motion estimation unit 132. When the encoder 30 is encoding an intra-coded image, i.e., the full contents of a block from the video input 90, the coding control unit 120 provides a signal over the first control line 122 to the first switch 100 indicating that it should be connected the first input 102, which provides a direct connection to the video input 90. The coding control unit 120 provides a signal over the second control line 124 to the second switch 110 indicating that it should be connected to the first input 112, which is left open. The coding control unit 120 also sets an inter/intra flag 134 to indicate that the encoded block represents an intra-coded image.

The video input 90 is fed through the first input 102 of the first switch 100 to the output 106, where it is provided to the discrete-cosine transform (DCT) unit 140. The DCT unit 140 performs a two-dimensional DCT on the video input 90 and provides the transformed input to a quantization unit 142. The quantization unit 142 divides each value in the transformed input by a quantization step, with the quantization step for each coefficient of the transformed input being selected from a quantization scale. The coding control unit 120 stores the quantization scale. Since MPEG does not specify a particular quantization scale, the quantization scale is provided along a quantization scale signal line 144 to the quantization unit 142, to a de-quantization unit 146, and to subsequent processing as required for reconstruction of an encoded image. The transformed, quantized input is provided as a quantization index along a quantization index signal line 148 for further processing. Prior to storage or transmission, the quantization index is further compressed using re-mapping, run-length coding, and Huffman coding, all of which may be as specified by the MPEG standard.

In order to perform differential, inter-frame coding, as distinguished from the intra-frame coding described above, the quantization index is further provided to the de-quantization unit 146. The de-quantization unit 146 de-quantizes the quantization index and provides the resulting de-quantized coefficients to an inverse DCT unit 150. The inverse DCT unit 150 performs an inverse DCT transformation of the de-quantized coefficients to provide a reconstructed image to a summing unit 152. The summing unit 152 adds the output of the inverse DCT unit 150 to the output 116 of the second switch 110. When intra-coding a video input 90, the second switch 110 has no input, so the summing unit 152 simply provides the output of the inverse DCT unit 150 to the motion estimation unit 132.

In order to provide greater compression, the encoder 30 periodically inter-codes the video input 90 based upon changes in the video input 90 over time. In order to inter-code the video input 90, the coding control unit 120 sets the inter/intra flag 134 to indicate the next block of data is inter-coded. The coding control unit 120 also sets the first switch 100 to receive a signal from its second input 104, and sets the second switch 110 to receive a signal from its second input 114. In this state, the output of the summing unit 152, which is a reconstructed image of the video input 90, is fed through the motion estimation unit 132 to both the differencer 130 and the second input 114 of the second switch The differencer 130 subtracts the reconstructed image from the video input 90, and provides the resulting difference image to the DCT unit 140 through the first switch 100. The transformed difference image is then quantized by the quantization unit 142, and the resulting quantization index signal is provided for further processing. The transformed difference image is also de-quantized in the de-quantizing unit 146, and the resulting reconstructed difference image is added to the previous reconstructed image in the summing unit 152, to provide a completely reconstructed image to the motion estimation unit 132.

The motion estimation unit 132 performs an additional compression function, motion estimation/compensation, that is supported by the MPEG standard. Since MPEG processing works on discrete eight-by-eight blocks of image data, a complete image is typically formed by combining a number of blocks into a frame. By storing an entire previous frame in the motion estimation unit 132, that frame can be searched for matches or near matches to the current video input 90. An inter-coded differential block can then be prepared representing the difference between the current video input 90 and some spatially offset block from the previous frame, and the co-ordinates of the spatial offset are transmitted to further processing stages as a motion vector signal 160.

For the embodiment described herein, it is necessary to note that for MPEG video compression, the energy of block of video information is calculated after motion estimation for deciding the coding node for the block. Herein, as described in greater detail with reference to FIG. 3, those video information blocks which are identified as zero blocks are advantageously directly coded without undue processing which would be required for non-zero blocks.

Figure 3:
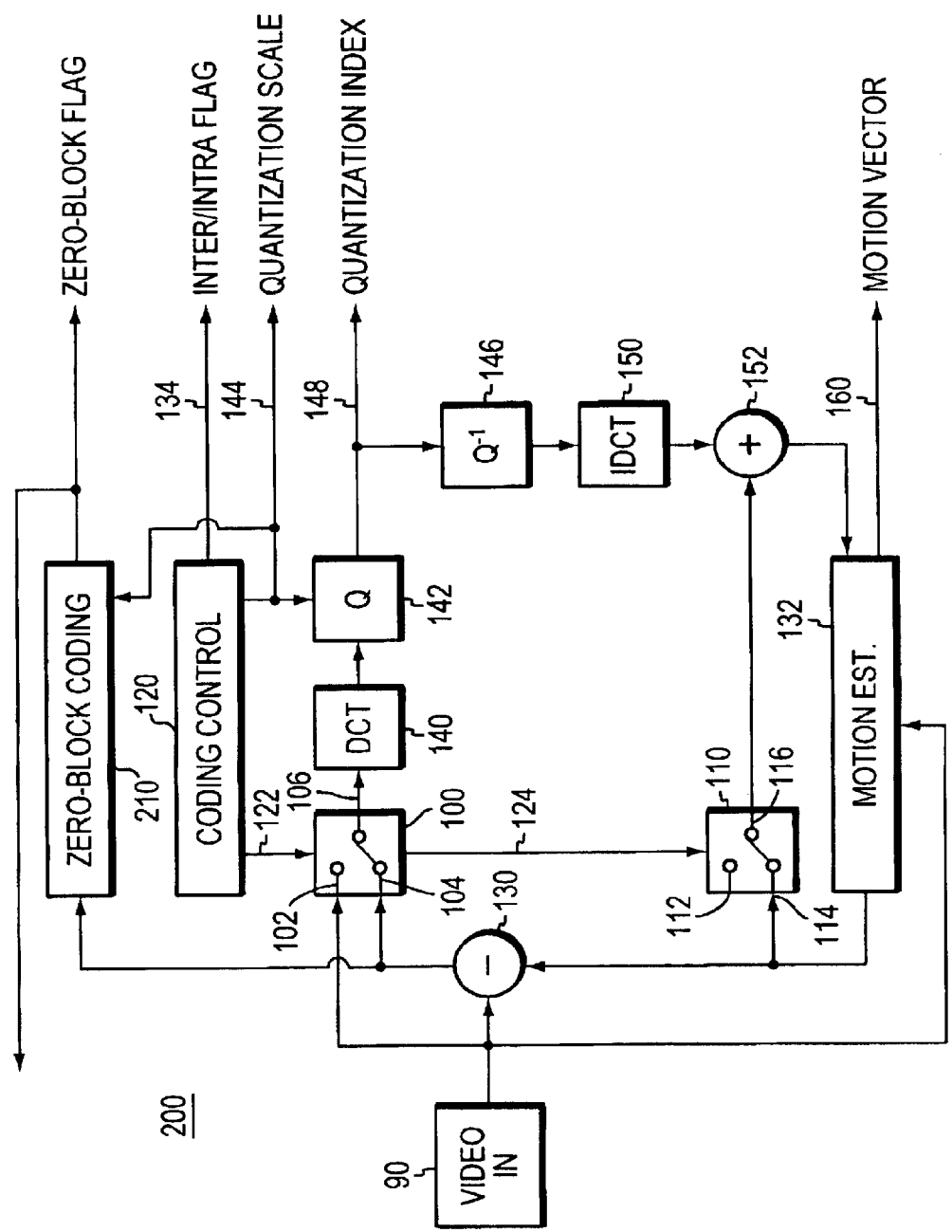
FIG. 3 is an illustration of a preferred embodiment of an MPEG encoder incorporating the invention and with certain improvements over the encoder of FIG. 2.

FIG. 3 shows an MPEG encoder 200 according to a preferred embodiment of the present invention. The encoder 200 operates in a similar manner to the conventional MPEG encoder 30 of FIG. 2, with differences as noted below.

The encoder 200 includes a zero-block coding unit 210. The zero-block coding unit 210 receives a difference image from the differencer 130, as well as the quantization scale from the coding control. The zero-block coding unit 210 calculates the total energy in the difference image, i.e., the sum of the squares of all of the pixel values. The zero-block coding unit 210 also calculates the square of the first quantization step, which represents the DC or average quantization step size. According to the special case of Parcevel Theory, the total energy of the pixel values of a block in any given picture frame is equal to the total energy of its discrete cosine transform (DCT) coefficients. As aforesaid, for the purpose of this invention, when an encoded block of video data is identical to an adjacent un-encoded block of video data and the identity is caused by the fact that there is little or no change between consecutive frames of video, if the total energy of the difference image is smaller than the square of the quantization step size, the encoded block will not contain any quantized coefficients. Such a block qualifies to be identified as a zero block. Therefore, it is possible to detect a zero block based on the total energy of the block and the quantization step size. For a zero block, since the total energy of the block is smaller than the square of the quantization step size, then the block will not contain any quantized coefficient and need not be subjected to any DCT nor any quantization, thus saving on processing costs.

The hardware and architecture needed for encoding and decoding (MPEG decompression) based on relevant standards as well as the processor required memory/storage are in themselves well known to artisans in the field and are not elaborated here.

The hardware and infrastructure illustrated in FIG. 3 with respect to the preferred embodiment is illustrative only. Many variants of components illustrated in the FIG. 3 embodiment are within the scope of this invention. For example, the quantization unit 142, inverse quantization unit 146, the discrete cosine transform (DCT) unit 140, the inverse DCT unit 150, motion estimation unit 132, can all be substituted with equivalent units which perform similar functions respectively. While a preferred exemplary embodiment has been described herein, variations will become apparent to those skilled in the art. For example, the digital camera 20, encoder 30, decoder 50 may be replaced by functional equivalents. Even the internal structural details of the encoder 30 including switches and control lines therein may be replaced by functional equivalents. Likewise, the discrete-cosine transform unit DCT, quantization and dequantization units and the motion estimation unit per se may be replaced by functionally equivalent units. Other structural elements and hardware required to perform the zero block motion compensation/estimation may be chosen to generally satisfy MPEG requirements and will be intelligible to those who are skilled in the art. Various modifications of the elements used in the context of explaining the preferred embodiment may be used to implement the invention, and are within the scope of the present invention as defined in the appended claims.

What is claimed is:

1. An MPEG encoder/decoder system of the type wherein each picture frame is divided into blocks which are processed and encoded based on a quantization step size and a difference image between consecutive blocks, the system comprising:

a motion estimation unit which performs estimation/compression and compares a previous video frame stored with current video input, and looks for matches to generate a motion vector signal;

a zero block encoding unit which calculates a square value of a first quantization step and ascertains if a total energy value of said difference image is smaller than the calculated square value of the first quantizations step, the zero block encoding unit acting to identify a zero block if the ascertaining is affirmative; and for encoding a zero block directly without additional processing if the ascertaining is affirmative.

2. A system as in claim 1 wherein the zero block encoding unit includes means to generate a zero block flag which identifies a zero block.

3. A system as in claim 1 including a coding control unit which sets an intracoded image signal to indicate that an encoded block represents an intracoded image.

4. An improved Motion Picture Experts Group (MPEG) encoder/decoder apparatus of the type wherein picture frames are divided into blocks and subjected to processing and encoding using Discrete Cosine Transforms (DCT) based on a quantization step size and a difference image between consecutive blocks, the apparatus comprising:

a motion estimation unit which performs estimation/compression and compares a previous video frame stored with a current video input, and looks for matches to generate a motion vector signal, and a zero block encoding unit which calculates for a video block a square value of a first quantization step and ascertains if a total energy value of said difference image is smaller than the calculated square value of the first quantization step, the zero block encoding unit then enabling to encode said video block directly as a zero block without additional processing if the ascertaining is affirmative.

5. Apparatus as in claim 4 wherein the zero block encoding unit includes means to generate a zero block flag which identifies a zero block.

6. Apparatus as in claim 4 including a coding control unit which sets an intracoded image signal to indicate that an encoded block represents an intracoded image.

7. A Motion Picture Experts Group (MPEG) encoder/decoder system wherein each picture frame is divided into blocks which are processed and encoded based on a quantization scale and a difference image between consecutive blocks, the system comprising:

identifying means for identifying at least one zero block which results when an unencoded block of video data is identical to an adjacent un-encoded block of video data, said identifying means being connected to and cooperating with (i) means for comparing total energy of a difference image to a quantization step size, (ii) means for ascertaining if the total energy of the difference image is smaller than a square of the quantization step size and means for, if (ii) above is affirmative, directly encoding a zero block without any other processing.

8. A system as in claim 7 wherein said identifying means includes means to generate a zero block flag which identifies a zero block.

9. A system as in claim 7 including a coding control unit which sets an intra coded image signal to indicate that an encoded block represents an intracoded image.

10. An MPEG encoder/decoder system of the type which subjects video data blocks from each video frame of incoming video data to motion estimation before encoding, said system comprising:

a control unit which stores a quantization scale and sets an intracoded image signal indicating that an encoded video data block represents an inter/intra coded image;

a quantization unit receiving inputs from the control unit and a discrete cosine transform (DCT) unit and dividing each value of an input by a quantization step selected from a quantization scale stored in the control unit, said DCT unit applying a DCT transform to received signals and sending an output to the quantization unit;

an inverse quantization unit and an inverse DCT unit which receive transformed signals from the quantization unit to produce a reconstructed image;

a motion estimation unit which performs estimation/compression and compares a previous video frame stored with current video input to look for matches for generating a motion vector signal and a difference image; and a zero-block encoding unit which calculates a square value of a first quantization step and ascertains if a total energy value of said difference image is smaller than the square value of the first quantization step, said zero block encoding unit enabling to encode a video data block directly if the ascertaining is affirmative.

11. A method of compressing video data of the type wherein each picture frame is divided into blocks which are processed and encoded based on a quantization step size and a difference image between consecutive blocks, the method including the step of identifying at least one zero block which results when an un-encoded block of video data is identical to an adjacent un-encoded block of video data by:

(i) comparing total energy of a difference image to a quantization step size;

(ii) ascertaining if the total energy of the difference image is smaller than a square of the quantization step size; and (iii) if (ii) is true, then directly encoding a zero block without any other processing.

12. A method as in claim 1 wherein the step of identifying includes generating a zero block flag which identifies a zero block.

13. A method as in claim 1 including setting a flag through a coding control unit to indicate that an encoded block represents an intracoded image.

* * * * *

UNITED STATES PATENT AND TRADEMARK OFFICE
CERTIFICATE OF CORRECTION

PATENT NO. : 6,847,684 B1
APPLICATION NO. : 09/585492
DATED : January 25, 2005
INVENTOR(S) : Wei-Lien Hsu It is certified that error appears in the above-identified patent and that said Letters Patent is hereby corrected as shown below:

IN THE CLAIMS

Claim 1, Column 6, line 49, after "and" insert --means--

Claim 7, Column 7, line 21, delete "unencoded" and insert therefor --un-encoded--

Claim 12, Column 8, line 38, after "claim" delete "1" and insert therefor --11--

Claim 13, Column 8, line 41, after "claim" delete "1" and insert therefor --11--

Signed and Sealed this

Twenty-sixth Day of June, 2007

JON W. DUDAS
*Director of the United States Patent and Trademark Office*